United States Patent
Shenfield et al.

(10) Patent No.: US 7,761,522 B2
(45) Date of Patent: *Jul. 20, 2010

(54) SYSTEM AND METHOD FOR PROVIDING ASYNCHRONOUS NOTIFICATIONS USING SYNCHRONOUS DATA SOURCES

(75) Inventors: Michael Shenfield, Richmond Hill (CA); Brindusa L. Fritsch, Toronto (CA); Robert Kline, Richmond Hill (CA)

(73) Assignee: Research in Motion Limited, Waterloo, Ontario (CA)

( * ) Notice: Subject to any disclaimer, the term of this patent is extended or adjusted under 35 U.S.C. 154(b) by 1241 days.

This patent is subject to a terminal disclaimer.

(21) Appl. No.: 11/257,090

(22) Filed: Oct. 25, 2005

(65) Prior Publication Data

US 2007/0088790 A1    Apr. 19, 2007

(30) Foreign Application Priority Data

Oct. 13, 2005    (EP)    ................... 05109556

(51) Int. Cl.
*G06F 15/16* (2006.01)
(52) U.S. Cl. .................. 709/206; 709/224; 709/225; 709/207
(58) Field of Classification Search .......... 709/206, 709/224, 225, 207
See application file for complete search history.

(56) References Cited

U.S. PATENT DOCUMENTS

| | | | |
|---|---|---|---|
| 6,029,175 A | 2/2000 | Chow et al. | |
| 6,336,135 B1 * | 1/2002 | Niblett et al. | 709/215 |
| 6,633,910 B1 * | 10/2003 | Rajan et al. | 709/224 |
| 2003/0026231 A1 | 2/2003 | Lazaridis et al. | |
| 2006/0182050 A1 * | 8/2006 | Dohm | 370/312 |
| 2006/0221920 A1 * | 10/2006 | Gopalakrishnan et al. | 370/338 |
| 2006/0235970 A1 * | 10/2006 | Bateman et al. | 709/225 |
| 2007/0005751 A1 * | 1/2007 | Mason et al. | 709/224 |

FOREIGN PATENT DOCUMENTS

WO    WO 01/77842 A    10/2001

OTHER PUBLICATIONS

A Escudero-Pascual; G Q Maguire Jr "Role of a Proxy in Location Based Services" Feb. 20, 2002 pp. 1-13.

* cited by examiner

*Primary Examiner*—Dustin Nguyen
*Assistant Examiner*—Joel Mesa
(74) *Attorney, Agent, or Firm*—Xiang Lu; Gowling Lefleur Henderson LLP

(57) ABSTRACT

A method for providing access to one or more notification-based Web services using a mobile device, the method comprising the steps of transmitting to Web service proxy a subscription request for a requested Web service, the Web service proxy supporting asynchronous communication with the mobile device, storing a device identification and subscription request at the proxy, the proxy polling the Web service with the request, receiving at the proxy a response message determined by the Web service and in response to the polled request, continuing to poll the Web service and transmitting the response message to the mobile device only when the response message satisfies a predetermined criteria.

16 Claims, 5 Drawing Sheets

SYSTEM AND METHOD FOR PROVIDING ASYNCHRONOUS NOTIFICATIONS USING SYNCHRONOUS DATA SOURCES

FIELD OF THE INVENTION

This application is based upon and claims the benefit of priority from prior European Patent Application No. EP05109556.0, filed on Oct. 13, 2005, the entire contents of which are incorporated herein by reference.

The present matter relates to the field of software notifications. In particular, embodiments of this matter relate to implementing wireless notification-based applications using synchronous poll-based Web services.

BACKGROUND OF THE INVENTION

Users of handheld wireless devices now have available to them services that provide notification of time-sensitive events and information. Content providers generate content for notifications. The content is typically electronically stored to a data source and made available via a service-oriented architecture, for delivery via a network to one or more subscribing users electronically. For example, a news organization may provide notification content relating stock prices, breaking news, weather conditions, traffic conditions, etc. A user's expressed interest to receive electronic notifications for a particular class of content is generally called a notification subscription. Such subscriptions often are made between the end user and the content provider that sends the notifications. Event-driven notifications of this type are often referred to as alerts.

There is no built-in support in a service-oriented architecture (like Web services) to inform a client, such as a subscribing users wireless device, of its state changes. This is an important distinction for a service-oriented architecture as most computing systems are asynchronous in nature and the client needs to acquire such a change of the state through some asynchronous mechanism.

The client needs to know the information of interest is posted or when there is a change in the status of the posted content. Such information ideally needs to be "pushed" over the network to the client either periodically or when certain predefined events occur. Some examples of possible push situations are arrival of new e-mail, stock market information, multi-user game updates, etc. Typically, the information pushed to the client is a push notification which returns the updated data in response to an earlier submitted subscription message from the client device. Alternatively, a push notification can be a code (e.g. a Boolean value), which informs the client device that a detailed response is available for retrieval from the Web service.

Invoking Web service operations from a wireless device using synchronous communication methods exclusively is considered expensive and impractical. Most Web services employ protocols with a large footprint (e.g. SOAP) and are designed mostly for synchronous communication ("request/response" or "pull") on wired networks. In a synchronous scenario, the client initiates the communication by sending a request to the server and waits to receive the response on the same connection. However, in the wireless space, where resources and bandwidth can be limited and data traffic cost can be high, synchronous communication is undesirable.

A common technique to deliver content to the wireless device is when the user of the device requests or "pulls" the content from the network. In other words, the content of interest (or the indication whether the content is present) is available in the network, but the user needs to issue a retrieval request to access the information. Current wireless systems operate by the wireless device repeatedly polling the server for data to satisfy the request. From a practical point of view, wireless communications can have higher cost than wired communications and usually are characterized by higher latency times, making a "pull" from a wireless device inherently expensive. Also, slow connection times sometimes might be annoying to a user, such as extended wait times to process the request, including periodic loss of services connection during the wait time.

While asynchronous Web services would be an ideal choice for a wireless alert or notification system there are a number of factors limiting the use of asynchronous Web services. Typically, the development effort and the skills required by a programmer to build an asynchronous services architecture for a data source are far greater than for a synchronous one. Additionally, in order to provide asynchronous notification to the wireless user when the event of interest has occurred, the data source is required to maintain a significant amount of state information (i.e. subscription information/filters, subscriber call-back address, etc.) and perform extensive calculations when internal state change events occur, such as matching event information with every subscription filter on record. These factors negatively affect availability and scalability of the system especially in the wireless space where the number of subscribers could easily reach several hundreds of thousands.

Accordingly, there is a need for a wireless alert or notification system, which is capable of using standard synchronous Web services.

BRIEF DESCRIPTION OF THE DRAWINGS

An embodiment or embodiments will now be described by way of example only with reference to the following drawings in which.

DETAILED DESCRIPTION

Figure 1:
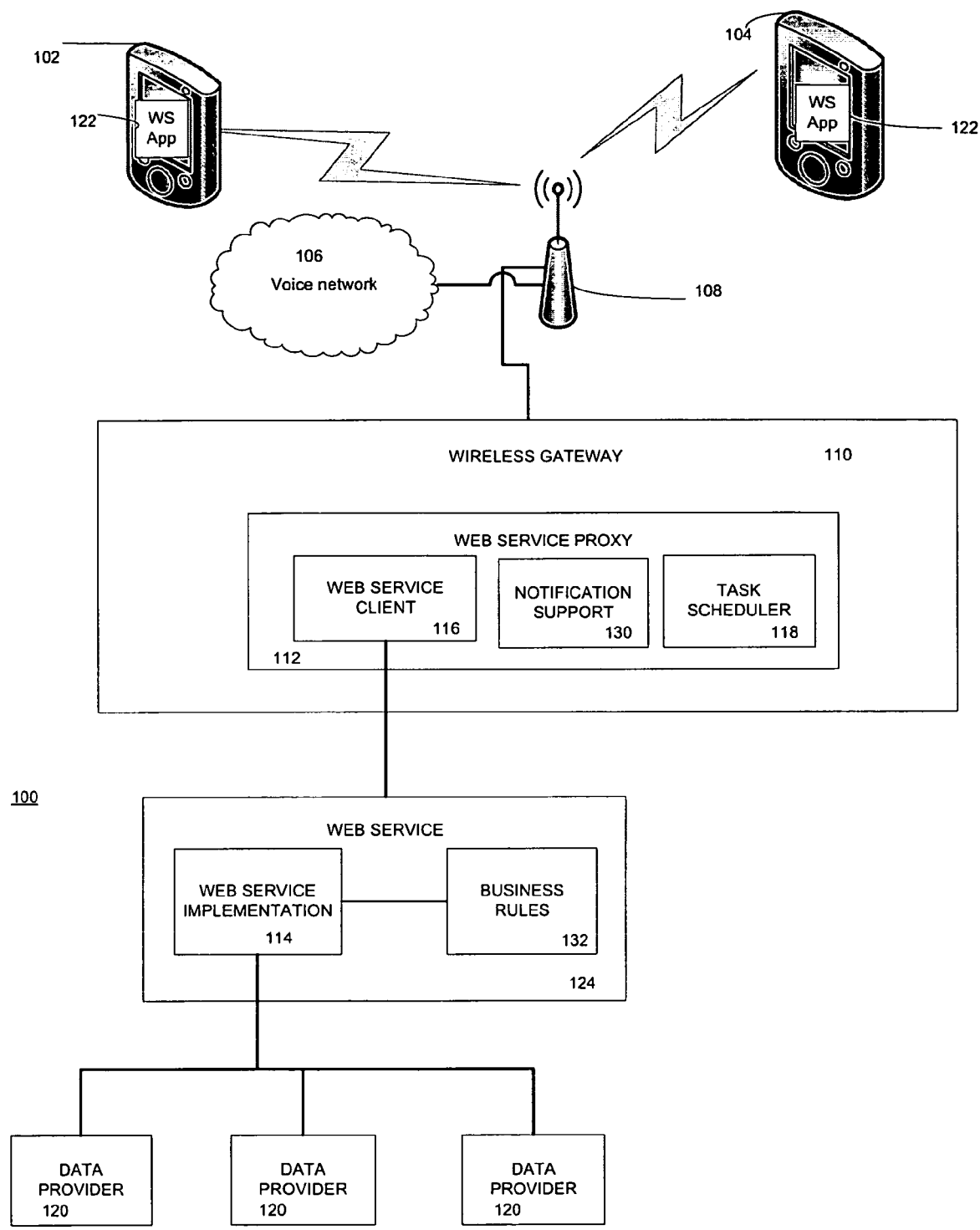
FIG. 1 illustrates a block diagram of a wireless telecommunications network adapted according to an illustrative embodiment of the matter.

In the following description like numerals refer to like structures and processes in the drawings.

The present matter seeks to provide a system and method for enabling asynchronous communication between one or more synchronous Web services and a wireless device to obviate or mitigate at least some of the above-presented disadvantages.

An advantage of the present matter is that it provides an inexpensive and less complex notification model that reduces wireless overhead.

In accordance with this matter there is provided a method for providing access to one or more notification-based Web services using a mobile device, said method comprising the steps of:

(a) transmitting a subscription request, received from a mobile device, for a requested Web service;
(b) polling said Web service in accordance with the subscription request;
(c) receiving a response message in response to said poll; and
(d) forwarding said response message asynchronously to said mobile device when said response message satisfies a predetermined criterion.

In accordance with another embodiment of the matter the method includes storing a device identification and the subscription request to facilitate said polling and said forwarding.

In accordance with another embodiment of the matter the predetermined criterion comprises the presence of new content in the response and the method further comprises determining whether content is present in said Web service response message.

According to a further aspect the notification-based Web services is a schema defined service, such an XML Web service.

In accordance with another aspect of the matter there is provided a system for providing access to one or more notification-based Web services using a mobile device, comprising:
(a) a Web service proxy server for receiving a request for a requested Web service;
(b) a task scheduler associated with said proxy for issuing a polled request message to said Web service at predetermined time intervals;
(c) business logic associated with said Web service to generate a response message to said polled request; and
(d) a message push mechanism for forwarding by said proxy said response message to said mobile device upon said response message satisfying a predetermined criterion.

In accordance with a still further aspect of the matter the business logic of the Web service compares the content available at the data source with the subscription filter and determines whether there is a match between the available content and the subscription filter and forwards the content to the proxy if there is a match.

In accordance with a still further aspect of the matter there is provided a Web service proxy, comprising:
(a) a first set of ports for communicating asynchronously with a mobile device;
(b) a second set of ports for communicating synchronously with a Web service; and
(c) a task scheduler for coordinating communication between said first and second set of ports.

In accordance with a still further aspect there is provided a device, comprising a client module that receives an input from a user for a requested Web service; and a transmitter for forwarding the request to a Web services proxy, wherein the proxy generates a Web services request corresponding to the requested Web service and polls the Web service with the Web services request.

Referring to FIG. 1, there is shown a wireless communication network 100 adapted to allow mobile devices 102, 104 running notification-based applications to access one or more synchronous, poll-based Web services 124 or backend servers. Mobile devices 102, 104 wirelessly communicate over voice/data network 106 via one or more base stations 108 via a wireless gateway 110 as is known in the art.

The wireless gateway 110 includes a Web services proxy module 112, which in turn includes a Web services client 116 for communicating with a Web service 124, a notification support module 130, and a task scheduler module 118. The gateway 110 may be a network server or other computer with software adapted to perform as described herein, and that includes one or more network interfaces. The gateway 110 and the Web services proxy server 112 may be combined and their functions performed by a single device. The gateway may be directly connected to a Web service 124 or through a Web service aggregator, or also connected through a data network e.g., the Internet, to one or more Web services data providers. The Web service 124 includes a Web service implementation 114 and a business rules module 132 associated with the particular Web service implementation 114. Typically the Web service implementation 114 aggregates services from a number of data providers 120 for presentation to Web service subscribers. The gateway 110 may also be connected to a Web service registry and description server (not shown). One of skill in the art will appreciate that the Web service proxy 112, the Gateway 110, and various Web services 124 can be accessed either by a private network; a public network, or configured together on the same machine.

As is known in the art, the Web service 124 may be described by a service description language (such as WSDL), representing a source schema definition of the service. The Web service 124 is connected to the gateway 110 via the service proxy server 112. It is recognised that the functionality of the service proxy server 112 could be hosted on one server or on a distributed network of servers, as desired. The proxy server 112 provides for asynchronous messages (i.e. request/response and/or push) communication between the wireless devices 102,104 and the service 124. The Web services proxy 112 can provide a platform-neutral communication pipe based on a set of standard protocols. As will be described later the Web service is modified to include a business rules module 132 for determining whether or not its data content matches a user's subscription filter.

Each mobile device 102, 104 has stored in memory a Web service (WS) client application 122. The WS client application 122 allows a user of the mobile device 102, 104 to initiate and engage a Web service 124, which aggregates data from one or more data providers 120, via the Web service proxy 112. The term WS as used herein refers to one or more generic schema defined services, which can be made available to wireless devices via queries/requests and responses through a wireless gateway. The WS client application 122 may be a zero-client browser-based application or thick-client application.

The Web service 124 can be defined as a software service of the proxy server, which can implement an interface expressed using for example, such as but not limited to, a Web Services Description Language (WSDL) registered in a Universal Discovery Description and Integration (UDDI) Registry (not shown) and can communicate with client devices by being exposed over the gateway 110 through the Simple Object Access Protocol (SOAP). SOAP is a specification that defines the XML format for the communications, including a well-formed XML fragment enclosed in SOAP elements. Alternatively, the Web service 124 may use other known communication protocols, message formats, and the interface may be expressed in other Web services languages than described above.

The mobile devices 102,104 have a receiver for receiving messages from the gateway 110 as well as a transmitter for sending messages to the gateway 110 for eventual delivery to such as, but not limited to, Web service 124.

Once a WS client application 122 in a mobile device learns about a Web service, the Web service proxy 112 facilitates communications between the client and the Web service based on the data obtained by a Web service broker. A service controller (not shown), generally associated with the gateway, determines the service description used by the Web service (e.g., by retrieving the Web service's corresponding metadata from a database), obtains any necessary parameters from the client, translates the information into a message format understandable by the Web service, and forwards the message to the requested Web service. Upon receiving the response from the Web service, the Web service proxy translates the message into messages understandable by the client, and forwards the message to the requesting WS client. The service controller contains the logic that drives the service invocation behaviour of the gateway.

Figure 2:
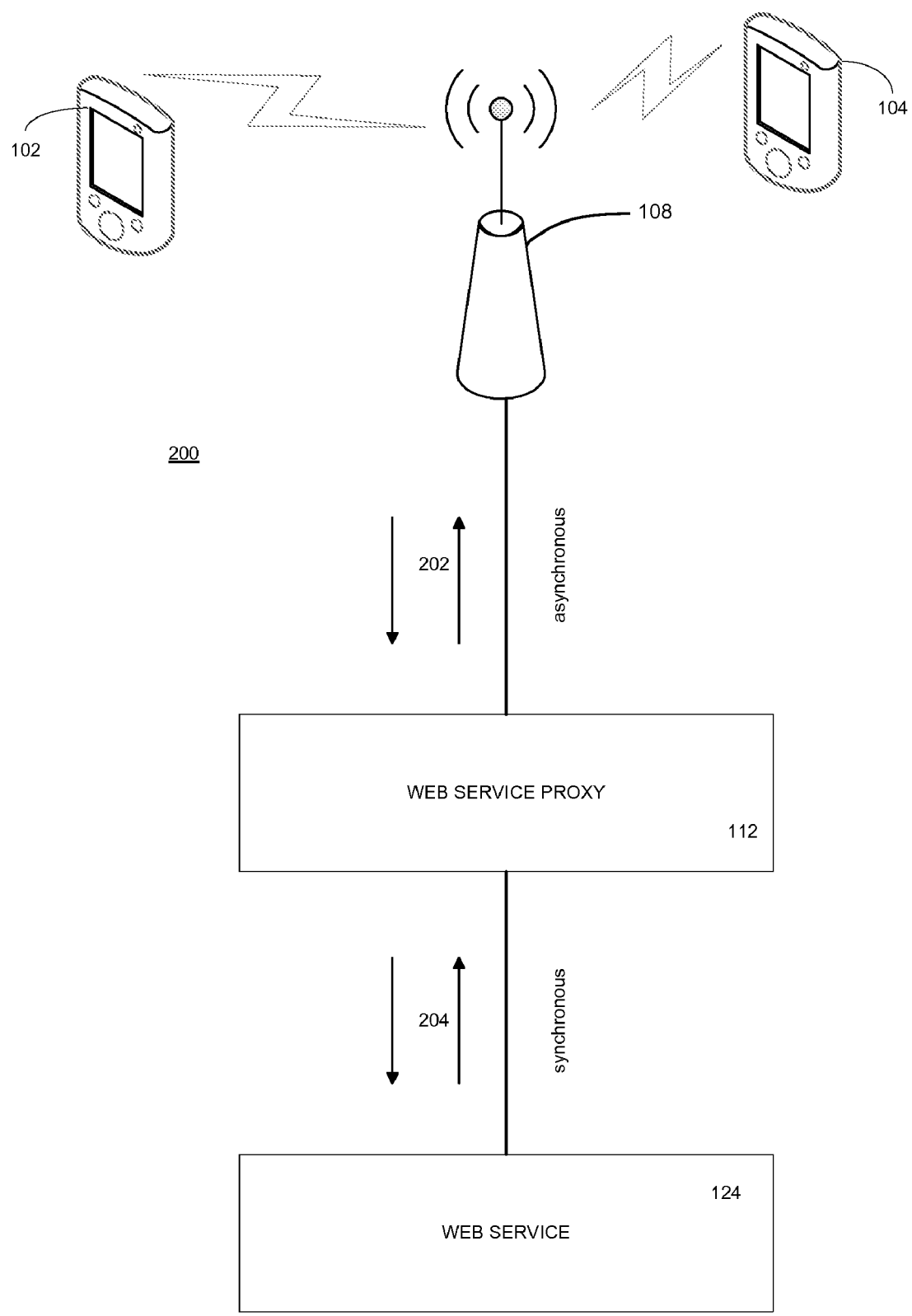
FIG. 2 is a conceptual view of an embodiment of the matter.

Using the above-described architecture the Web service proxy 112 may be adapted to communicate synchronously 204 with each Web service 124 and asynchronously 202 with each user accessing the Web service via a WS client as illustrated schematically 200 in FIG. 2. Accordingly, the requests and responses between a user device and a Web service can be delivered as asynchronous communications, as further described below.

Figure 3:
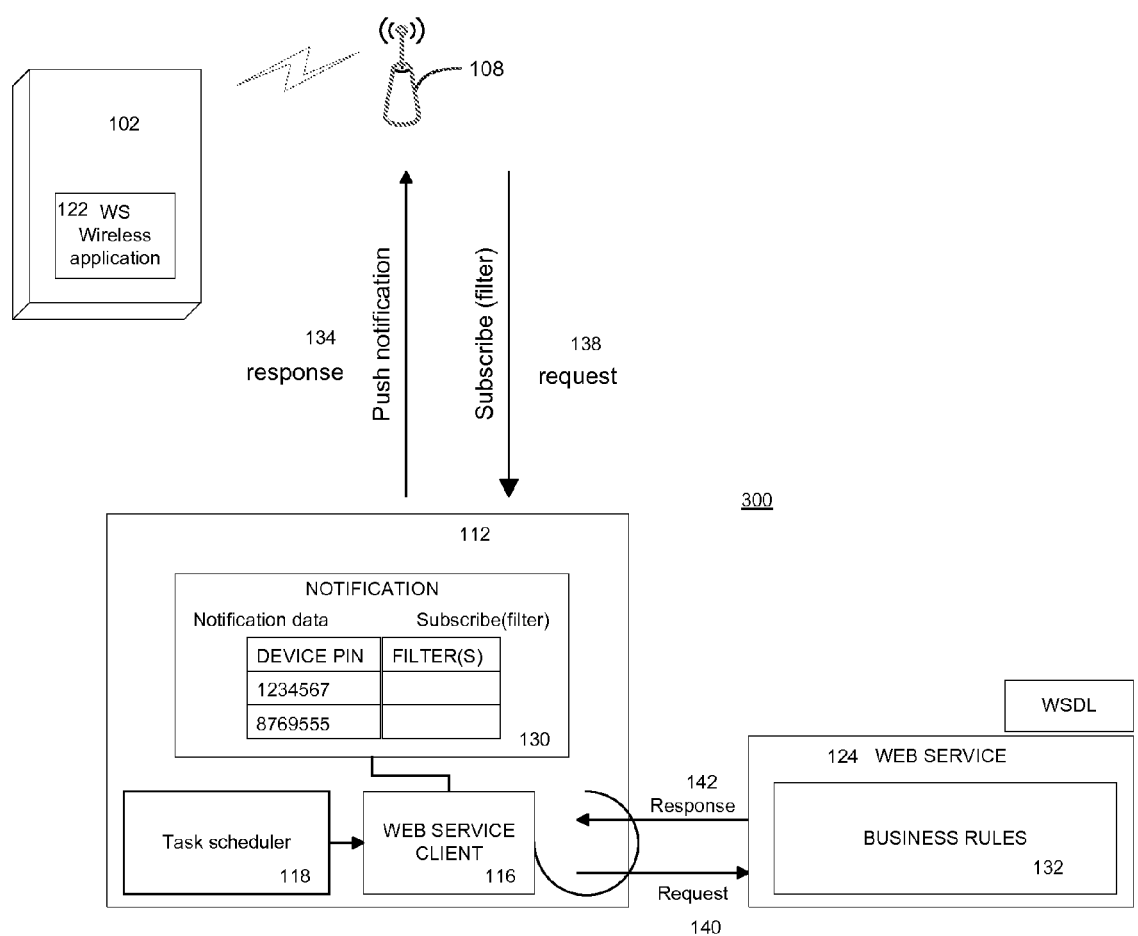
FIG. 3 is a block diagram showing, in greater detail, the embodiment of the wireless network shown in FIG. 1.

Referring to FIG. 3, the adapted wireless communication network 100 is shown in greater detail 300. As mentioned earlier, the Web service proxy (or mobile enabler) 112 is modified to include the task scheduler 118 for synchronously polling the Web service 124 via the Web service client 116, and the notification module 130 for storing subscriber information and corresponding subscription filters. The notification module 130 accepts an initial subscription request message 138 carrying a subscription filter from the mobile device. The notification module adds this to a table indexed against the appropriate device identification (such as a device PIN). The task scheduler uses the time interval or frequency specified in the subscription filter (or a pre-specified interval or frequency) to generate a timer event. On a timer event the service proxy 112 issues a synchronous SOAP request 140 to the Web service 124 and includes the subscription filter in the body of the request message. The business rules module 132 receives the request 140 and validates the received subscription filter against the available content and generates a response message 142 carrying notification data to be sent to the device 102. If no new information is required to be passed to the user the response message data 142 is empty. For example the Web service 124 can use the XML Schema definition language (XSD) schema element <xsd:choice> or <xsd:option> to send back this information.

The user is able to create the subscription filter, which defines the notification rules, at the time of initiating the subscription. The filter may include fields such as "polling frequency", percentage change in data etc. The polling frequency may also be coded into the Web service by the application developer. An example of a subscription filter may look like Filter:<ticker=MSFT, IBM, RIM; daily change=10%>

The task scheduler 118 in the Web service proxy 112 triggers timer events at the predetermined polling frequency and the Web service client module 116 polls the Web service 124, by sending a Request message 140, along with the corresponding subscription filter obtained from a specified requesting device 102 at subscription time. The Web service client 116 then receives the Response data 142 from the Web service 124 at the polling frequency and sends a Response 134 to the device if the Response data 142 received from the Web service 124 is not "empty".

Figure 4:
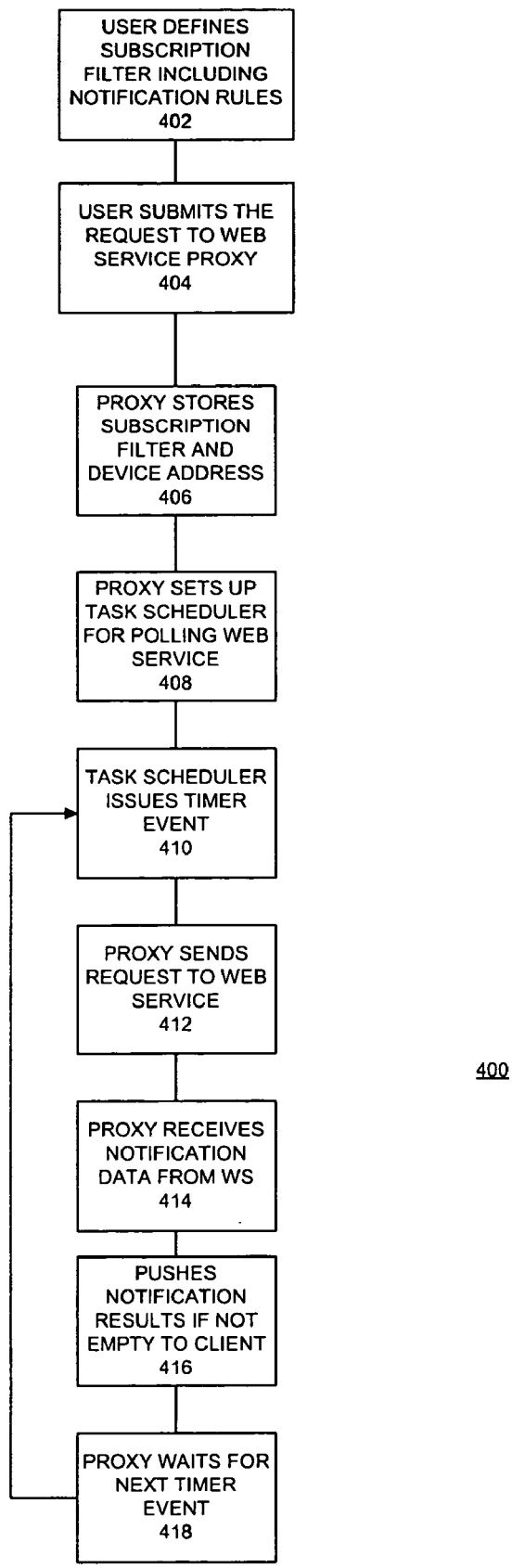
FIG. 4 illustrates a flowchart of operations for a mobile device to communicate with a Web service according to an embodiment of the matter.

Referring to FIG. 4 there is shown a flowchart of operations in accordance with an embodiment. At step 402 a user defines a subscription filter including notification rules; submits the request (step 404) to the web service proxy. At step 406 the proxy stores the subscription filter and device address or identification, at step 408 the proxy initializes the task scheduler for polling the web service and at step 410 the task scheduler issues timer events in accordance with the polling frequency set in step 408. At step 412 the proxy sends requests on the time events to the web service. At step 414 the proxy receives notification data from the Web service and at step 416 it pushes notification results if not empty to the client. At step 418 the proxy waits for a next timer event at which point it resumes at step 410 to issue a new timer event.

Figure 5A:
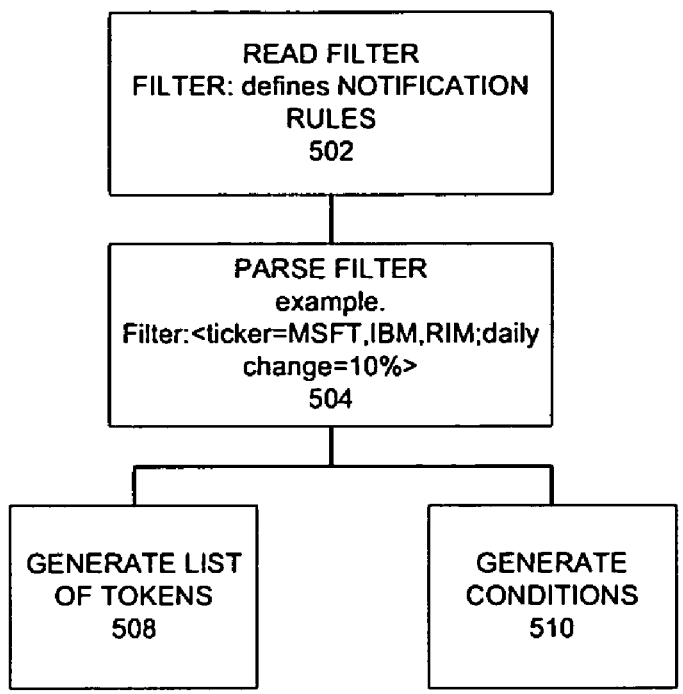
FIGS. 5a and 5b are flowcharts showing a business rules module implementation according to an embodiment of the matter.
Figure 5B:
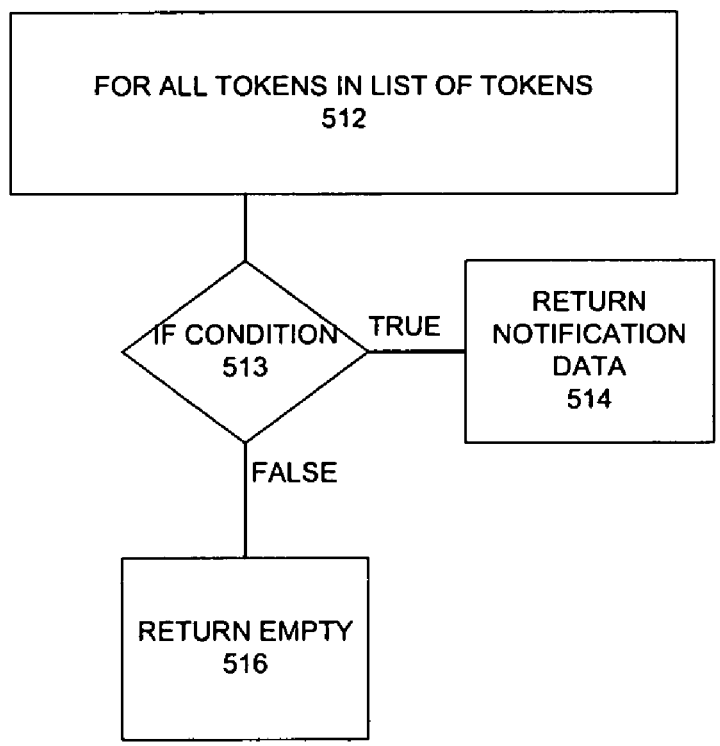

Referring to FIG. 5a and FIG. 5b there is illustrated the steps performed by the business rules of the Web service in deciding whether to respond with updated data to the proxy. Referring to FIG. 5a the business rules module reads a filter at step 502. At step 504 the filter is parsed to extract a list of tokens 508 (in this case the ticker symbols for a list of stock quotes) and its corresponding set of conditions 510 (for example the percentage change in a stock price). Once new data is available the module 132 scans the list of tokens 512 and determines whether any of the conditions corresponding to that token are true 513, if so it returns the appropriate notification data 514 otherwise it returns a null or empty value 516, as illustrated by the flowchart of FIG. 5b.

At design time the application designer for the WS application may mark the Request message as a poll subscription. After the message (subscription request 138) is issued by the WS client application 122 the Web service proxy attaches the subscription to the task scheduler 118. When attached, the task scheduler 118 will issue poll Requests 140 on behalf of the user as shown in FIG. 3. The notification module 130 maintains a table correlating the requesting device identification, such as the device PIN, with the current subscription filters.

Given the specific initial request 138 (such as initiated by the user or system services) to be notified with specific data on predefined conditions, the asynchronous push notification 139 is used. In asynchronous communications, the push notification 134 is used to send the appropriate data to the user's device 102 as soon as the data is available and/or the predefined response conditions have been met to trigger the data transmission as the push notification 134.

Typically, the push notification 134 returns the updated data in response to an earlier submitted subscription message from the client device. Alternatively, a push notification can be a Boolean value, which informs the client device that a detailed response is available for retrieval from the Web service.

In general, synchronous Web services can be defined as services that block/wait for a response. In contrast, asynchronous Web services can be defined as services that are invoked over existing Web protocols by a client (i.e. the mobile device) that does not wait for a response on the same connection/channel, but does expect a response at a later time on a different connection/channel. Therefore, in contrast with the synchronous communications, the sender (e.g. device) can submit the initial request 138, and then go about its work. If the reply 142 does come, then the original sender can pick it up when it wants. E-mail is one example where asynchronous communication between the device and the service is desired.

The proxy task scheduler 118 is a distinct intelligent component that periodically issues a timer event to poll the source Web service through synchronous intermediate polling communications for specific data changes corresponding to the initial request communication 138.

Accordingly, the asynchronous push notification 134 is returned to the device 102 as the response in connection with the request 138 that was sent, to the Web service 124 as the initial request notification 138.

Thus, by adding the above-described service proxy to the network, a network operator can offer device users asynchronous data support without performance overhead and design complexity of truly asynchronous solutions i.e. asynchronous data sources that store subscription information (e.g. subscription filters and subscriber addresses) and notify the subscribers when events of interest occur without the need for a polling request. By delegating subscription/notification handling to a service proxy the data source provider 120 is only required to provide business rules for matching subscription filters with the available data content. This system offers a simple asynchronous solution that utilizes standard synchronous Web services without requiring constant polling from the handheld thus reducing wireless traffic overhead.

While this matter has been described with respect to specific examples including presently preferred modes of carrying out the embodiments, those skilled in the art will appreciate that there are numerous variations, permutations and combinations of the above described systems and techniques that fall within the spirit and scope of the matter as set forth in the appended claims.

What is claimed is:

1. A method for providing access to a Web service using a mobile device, the method comprising:
   providing a Web service proxy server between the mobile device and the Web service, the Web service proxy server including a Web service client in communication with the Web service;
   receiving a subscription request from the mobile device at the Web service proxy server, the subscription request including a subscription filter;
   storing the subscription filter at the Web service proxy server, the subscription filter specifying a polling criterion and a device identification;
   sending a request message synchronously from the Web service client to the Web service in accordance with the polling criterion;
   receiving at the Web service client a notification data from the Web service; and
   forwarding the notification data asynchronously to the mobile device when the response message satisfies a predetermined criterion.

2. A method according to claim 1, wherein the polling criterion is a polling frequency, further comprising:
   generating a timer event according to polling frequency; and
   sending the request message in response to the timer event.

3. A method according to claim 1, wherein the predetermined criterion comprises a presence of new content in the notification data, further comprising:
   determining whether a content is present in the notification data from the Web service.

4. A method according to claim 1, wherein the polling criterion is a percentage change of a data.

5. A method according to claim 1, further comprising:
   comparing a content available at a data source with a filter included in the request message at the Web service.

6. A method according to claim 1, wherein the Web service is a schema-defined service.

7. A method according to claim 6, wherein the Web service is an XML Web service.

8. A system for providing access to a Web service using a mobile device, comprising:
   a Web service proxy server comprising a computer processor, said Web service proxy server residing between the mobile device and the Web service;
   the Web service proxy server receiving a subscription request from the mobile device, the subscription request including a subscription filter, the subscription filter specifying a polling criterion and a device identification;
   the Web service proxy server comprising:
      a notification module storing the subscription filter;
      a Web service client in communication with the Web service;
      the Web service client sending a request message synchronously to the Web service in accordance with the polling criterion, and receiving a notification data from the Web service;
   the Web service proxy server forwarding said notification data asynchronously to said mobile device when said response message satisfies a predetermined criterion.

9. A system according to claim 8, wherein the Polling criterion is a polling frequency, further comprising:
   a task scheduler generating a timer event according to polling frequency; wherein the Web service client sends a request message in response to the timer event.

10. A system according to according to claim 9, wherein the Web service compares a content available at a data source with a filter included in the request message.

11. A system according to claim 10, the Web service is a schema-defined service.

12. A system according to claim 8, wherein the predetermined criterion comprises a presence of new content in the notification data, and wherein the Web service proxy server determines whether a content is present in the notification data from said Web service.

13. A system according to claim 8, wherein the Web service is an XML Web service.

14. A system according to claim 8, wherein the polling criterion is a percentage change of a data.

15. A Web service proxy server in a wireless gateway, comprising:
   a first set of ports for communicating asynchronously with a mobile device;
   a second set of ports for communicating synchronously with a Web service;
   a notification module storing a subscription filter; and
   a Web service client in communication with the Web service through the second set of ports; the Web service client sending a request message synchronously to the Web service in accordance with a Polling criterion, and receiving a notification data from the Web service;
   wherein the Web service proxy server receives a subscription request from the mobile device through the first set of ports, the subscription request including the subscription filter, the subscription filter specifying the polling criterion and a device identification;
   wherein the Web service proxy server forwarding said notification data asynchronously to said mobile device through first set of ports when said response message satisfies a predetermined criterion; and
   wherein the Web service proxy server comprises a computer processor, the Web service proxy server resides between the mobile device and the Web service.

16. A Web service proxy server according to claim 15, wherein the polling criterion is a polling frequency, further comprising:
   a task scheduler generating a timer event according to polling frequency; wherein the Web service client sends a request message in response to the timer event.

* * * * *